United States Patent Office 2,864,670
Patented Dec. 16, 1958

2,864,670

PROCESS FOR RECOVERING ACID FROM WASTE ACID LIQUORS

Roger Walwark III, Red Bank, N. J., assignor to National Lead Company, New York, N. Y., a corporation of New Jersey No Drawing. Application April 11, 1955
Serial No. 500,688

9 Claims. (Cl. 23—172)

The present invention relates to the treatment of waste acid liquors and more expressly to the recovery of sulfuric acid from waste liquors resulting from acid digestion of titaniferous ores or concentrates.

Perhaps the most widely known method for preparing titanium dioxide pigment material is that of solubilizing titaniferous iron ore in concentrated sulfuric acid to form a digestion cake which is dissolved in water and weak acid to form a sulfate solution of titanium and iron values. Scrap iron or its equivalent is then added to the sulfate solution to reduce ferric iron values to ferrous iron, after which the solution is clarified, filtered and crystallized. The latter step is carried out to effect removal of most of the iron from the sulfate solution as copperas, $FeSO_4.7H_2O$. The sulfate solution then is concentrated and thereafter hydrolyzed to precipitate a titanium dioxide hydrate which is removed from the sulfate solution by filtration.

Coincident with precipitation of the titanium hydrate from the sulfate solution, an appreciable amount of sulfuric acid is liberated with the result that after filtration of the hydrolyzed sulfate solution to recover the titanium hydrate, the residual filtrate or waste acid liquor as it is sometimes called, contains appreciable amounts of sulfuric acid together with ferrous sulfate, titanium values, and a major portion of the impurities originally in the ore.

It has been attempted heretofore to treat these waste acid liquors so as to crystallize and remove a part of the iron values as ferrous sulfate for the purpose of concentrating and recovering the free acid values from the treated liquor, but inevitably a highly voluminous, gelatinous sludge has been formed in the liquor. This sludge has not been amenable to filtration and has caused excessive scaling of equipment, blinding of filter cloths, and gelling of tank contents, any one or all of which factors has contributed to shut-downs and inefficient operations. All previous efforts to remove this gelatinous sludge from the concentrated liquor have been unsatisfactory. Thus, the recovery and concentration of free-acid values from waste acid liquors has not been achieved on a satisfactory commercial scale; and as a consequence, waste acid liquors are quite generally thrown away with the result that huge quantities of sulfuric acid are irretrievably lost to industry.

Although there has been some conjecture as to the identity of the gelatinous formation in these concentrated waste acid liquors, it has remained for the present inventor to identify and solve the problem of recovering a substantially pure sulfuric acid concentrate from a waste acid liquor. As mentioned at the outset, the waste acid liquors contain appreciable amounts of impurities such as, for example, iron, aluminum, magnesium, titanium, etc. It has now been found that the presence of these impurities in the waste acid liquors at too high a level is the principal factor contributing to the formation of the highly voluminous, gelatinous sludge in the concentrated product; and that by treating the liquors in a manner hereinafter more fully described, these impurities may be readily removed from the liquor to obtain a substantially pure residual acid solution amenable to concentration, i. e., without appearance of a gelatinous sludge in the concentrated product.

An object, therefore, of the present invention is to provide a simple and efficient method for recovering the acid values from waste acid liquors on a commercial scale.

Another object is to provide a method for treating waste acid liquors containing relatively dilute sulfuric acid so as to render the dilute sulfuric acid amenable to concentration.

A further object is to provide a method for the treatment of waste sulfuric acid liquors containing solubilized metallic impurities to produce an acid solution effectively free of the metallic impurities.

A still further object of the invention is to provide a method for treating a waste acid liquor derived by hydrolysis of titanium sulfate solutions so as to produce a residual acid solution containing substantially no iron, aluminum or magnesium values and hence adapted to produce a sulfuric acid concentrate.

Still another object is to provide a method for concentrating a dilute acid solution prepared from a waste acid and containing substantially no iron, aluminum or magnesium values and removing residual impurities from the concentrate.

Another object is to provide a method for preparing concentrated sulfuric acid from a waste acid liquor by treating the waste acid liquor to produce a dilute acid solution effectively free of iron sulfate, aluminum sulfate and magnesium sulfate; concentrating the dilute acid solution and removing residual impurities from the concentrate.

These and other objects, features and advantages of the invention have been found to be readily achieved by the novel process of this invention which contemplates broadly: a method for treating waste acid liquors containing sulfuric acid and dissolved metallic impurities by cooling the liquor under conditions such that crystals of the impurities may be formed and readily separated therefrom and thereby obtain a dilute acid solution, sometimes referred to hereinafter as a residual acid solution, relatively free of contaminants. More particularly, waste acid liquors containing undesirable amounts of aluminum, as well as other dissolved metallic impurities, are treated with an alum-forming constituent under conditions such that crystals of an alum salt may be formed along with crystals of the other impurities; and the resulting crystal mass is separated from the liquor to obtain a residual acid solution effectively free of sludge-forming contaminants, in particular ferrous sulfate and magnesium sulfate. Accordingly, the residual acid solution may be concentrated and processed to produce a sulfuric acid concentrate of high clarity and purity.

The present invention is particularly adaptable for treating the waste acid liquors which result from the digestion of titaniferous ores in sulfuric acid, as is practiced in the production of titanium dioxide pigment material. Such waste acid liquors contain, in the main, dilute sulfuric acid, and dissolved metallic impurities, the principal ones being the sulfates of iron, aluminum, titanium, and magnesium. It will be appreciated, however, that the method of the instant invention may be applied also to waste acid liquors containing the same or similar impurities but derived from other sources than the digestion of titaniferous ores, such as certain pickle liquors and the like.

In carrying out the process of the instant invention, a waste acid liquor containing dilute sulfuric acid, aluminum as aluminum sulfate, and other dissolved impurities such as magnesium and ferrous sulfate values, together with any entrained solids, is treated with an alum-forming constituent which is selected to react with the aluminum sulfate values in the waste acid liquor to form an alum salt. Also, it has been shown that chromium and ferric values in the liquor behave in the same manner as aluminum, i. e., crystallize out as alums. The alum-forming monovalent constituents which have been found effective for converting the sulfate of aluminum to alum salts are ammonium sulfate and potassium sulfate, and the sulfates formed by reaction of ammonia, ammonium compounds and potassium compounds with the sulfate values in the acid liquor. These alum-forming constituents may be introduced into the waste acid liquor in any of several ways. For example, ammonia may be added directly to the spent acid liquor to form ammonium sulfate in situ therein, or again a monovalent sulfate, such as for example potassium sulfate or ammonium sulfate, may be added to the waste acid liquor. These sulfates will combine with the aluminum sulfate values to form an alum salt upon cooling the solution to induce crystallization. For example, additional typical ammonium and potassium compounds which can be employed are: ammonium and/or potassium chloride, ammonium and/or potassium hydroxide, ammonium and/or potassium acetate, and ammonium and/or potassium carbonate.

By cooling the waste acid liquor having an alum-forming constituent provided therein in a manner hereinabove described, to a temperature within a predetermined range, an alum salt will crystallize out of the cooled liquor, along with such other impurities as ferrous sulfate, magnesium values, etc., as a filterable crystal mass. Typical of such alum crystals are those of ammonium alum as represented by the formula:

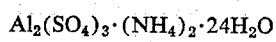

and potassium alum as represented by the formula:

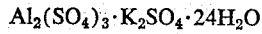

In this respect, however, it should be noted that alum is defined as a generic name given a group of double salts of the general formula $M_2(SO_4)_3 \cdot R_2SO_4 \cdot 24H_2O$, where M is a trivalent cation and may be Al, Cr, Fe, Mn, In, Tl, Ga, V, Co, Ti, Rh, etc., and R is a monovalent cation and may be $NH_4$, K, Na, Rb, Cs, Tl, Ag, hydroxylamine, or the radical of an organic quaternary base (e. g. $NMe_4$).

By adding ammonuim sulfate (or an equivalent alum-forming constituent) to the waste acid liquor at least in amount sufficient to react stoichiometrically with the aluminum sulfate values in the liquor, and then cooling to a temperature at least below about minus 10° C. and preferably as low as about minus 30° C., two phenomena will occur, namely a major portion of the ferrous sulfate values, magnesium sulfate values, etc., in the liquor will crystallize out, while an ammonium alum compound will crystallize out of the liquor as filterable crystals of ammonium alum. In this connection it has been found that superior results will be achieved if, after the liquor has been cooled sufficiently to initiate crystallization of the alum salt, the liquor is cooled to the low temperature at a rate sufficient to insure maximum growth of the individual crystals in the crystal mass. As an alternative, the liquor may be held at the low temperature, after relatively rapid cooling, for an extended period of time to permit growth of the individual crystals in the crystal mass.

Other expedients for increasing the rate of crystallization of the alum salts and the effectiveness of the alum salts in removing the aluminum sulfate values from the waste liquor may be utilized. For example, a seeding agent may be added to the waste liquor prior to crystallization and/or the liquor may be agitated mildly during the crystallization, both expedients serving to improve he rate of crystallization and the quality of the residual filtrate.

Further in this connection it has been established that the value of the residual filtrate as a source of highly concentrated sulfuric acid depends upon how free the filtrate is of dissolved metallic impurities values and that to be efficacious for the production of a sulfuric acid concentrate, the residual filtrate should contain no more than about 0.3% aluminum sulfate, as well as minor amounts of other impurities. For example, when the residual acid filtrate contains more than about 0.3% aluminum sulfate and is concentrated to recover the sulfuric acid values contained therein, it has been found that a highly voluminous, gelatinous sludge will form in the concentrated liquor and can only be removed from the concentrated liquor with difficulty, as experienced in employing prior known methods.

Following crystallization, the crystal mass may be readily separated by any suitable means, such as filtration or centrifugation from the crystallized liquor, to provide a residual filtrate which comprises an acid solution effectively free of iron, aluminum, magnesium values, etc.

The removal of iron, aluminum, other impurities, and water during the cooling period causes the acid concentration of the crystallized liquor to increase. It is important however that the acid concentration of the residual crystallized filtrate prior to subsequent concentration be maintained below about 55% $H_2SO_4$ and preferably below about 32% $H_2SO_4$ inasmuch as it has been found that an acid concentration at or above this amount will tend to precipitate an unfilterable mass of crystals. Also, it is preferred to add more than the stoichiometric amount of the monovalent alum-forming constituent which reacts with the aluminum sulfate values in the liquor.

Because the residual filtrate is now substantially free of aluminum values and contains substantially ineffectual amounts of other impurities, it may be concentrated successfully to an acid concentration at least as high as 75% $H_2SO_4$, and under favorable conditions to as high as about 98.5% $H_2SO_4$, without the appearance of a voluminous, gelatinous sludge in the concentrated product. In practice, the only limitation on concentration strength is the difficulty encountered with the inherent fuming qualities of $H_2SO_4$ at high concentrations. Concentration of the residual crystallized liquor is preferably carried out in a manner hereafter more fully described and such as to allow any minor amounts of any impurities remaining in the crystallized filtrate to precipitate out.

By way of describing the invention in more detail, a specific and preferred embodiment of the process of the instant invention is carried out as follows: A spent acid liquor derived from the hydrolysis of a titanium sulfate solution produced by digestion of titaniferous ore in concentrated sulfuric acid is introduced into a suitable container for treatment with an alum-forming constituent as hereinafter described. To the spent acid liquor is added an alum-forming constituent which, in the preferred embodiment of the invention, comprises ammonia which reacts with the sulfate values in the waste acid liquor to form an ammonium ion in situ. The amount of ammonia introduced into the waste acid liquor is such that it is at least substantially equivalent to that amount of ammonium sulfate required to react stoichiometrically with the aluminum sulfate values upon cooling to precipitate out crystals of ammonium alum. It is preferred, however, that the amount of ammonium ion in the waste acid liquors be in excess of the stoichiometric amount required to convert the aluminum sulfate values to ammonium alum, since, the excess amount of ammonium ion enhances the removal of the aluminum values. Further, it is postulated that excess ammonium ion may play a part in removing the residual impurities.

As suggested above, crystallization of the impurities, that is to say aluminum, iron, magnesium, etc., from the ammonium sulfate-containing liquor is initiated by cooling the solution in any well-known way to a temperature below about minus 10° C. and preferably as low as about minus 30° C. At the same time, aluminum crystallizes out as ammonium alum, together with ferrous sulfate, magnesium values and other impurities in the solution. Preferably the solution is cooled at a rate such as to produce a system more or less continuously in equilibrium, and such that the crystals produced can be readily separated from the solution. This practice permits a high degree of alum, iron and magnesium crystallization so that the residual filtrate obtained is substantially free of these and other impurities. Following crystallization of the aluminum values, the ferrous iron values, magnesium values, and other impurities, the crystal mass is separated and removed from the solution by any convenient means such as filtration or centrifugation to leave a clear residual filtrate. Due to the extremely low percent of impurities in the solution, it may be readily concentrated by convenient means to an acid content as high as about 98.5% $H_2SO_4$.

The clear residual filtrate should contain less than about 0.15% aluminum sulfate and preferably should contain less than about 0.07% aluminum sulfate. While solutions containing aluminum sulfate in the range of from 0.15% to about 0.3% $Al_2(SO_4)_3$ have been found amenable to concentration without excessive sludge formation, residual filtrate solutions containing 0.3% $Al_2(SO_4)_3$ or more have, upon concentration, exhibited the presence of undesirable amounts of aluminum sulfate precipitate in the concentrated product.

As hereinbefore described, the residual acid filtrate obtained by crystallization should preferably contain no more than about 32% $H_2SO_4$ and is concentrated by heating the residual acid filtrate to remove water by evaporation and crystallizing to remove any incipient solids such that the acid content of the sulfuric acid concentrate, after removal of the incipient solids, is at least 75% $H_2SO_4$. The concentrated solution may be aged at elevated temperatures for sufficient time to allow relatively minor amounts of any residual impurities to crystallize out. The most satisfactory results are realized by aging the concentrated solution at temperatures below about 70° C. and preferably at a temperature approaching 70° C. as an upper limit. Although temperatures above 70° C. may be used to age the concentrated solution, maintenance of equipment and materials handling at the higher temperatures becomes a practical as well as a major economic consideration. The crystalline solids obtained by aging the concentrated solution appear to be complex salts containing such residual impurities as iron, magnesium, titanium, manganese, etc., and which, contrary to prior art methods, are easily removed from the concentrated acid product. These solids are removed from the aged product by, for example, filtration to obtain at least a 75% $H_2SO_4$ concentrate. The solids cake from filtration may be washed with water or with the residual acid filtrate obtained after alum crystallization to decrease the loss of free sulfuric acid entrained in the solids cake. After removal of these incipient solids in the solution it will be found that the final $H_2SO_4$ concentrate will remain free and clear of precipitates even after long periods of storage and further, this final acid product may be fortified with an acid of higher $H_2SO_4$ content and/or oleum and still remain free and clear of precipitates.

The following illustrative examples are given in order that the invention may be more clearly understood and are not to be considered as a limitation of the invention.

*Example I*

To prepare a concentrated sulfuric acid solution from dilute waste acid liquors, a spent acid liquor derived from hydrolysis of a titanium sulfate solution produced by digestion of titaniferous ore was obtained and found to have the following analysis (percent by wt.):

| | |
|---|---|
| $H_2SO_4$ | 21.8 |
| $FeSO_4$ | 10.45 |
| $TiO_2$ | 0.56 |
| $Al_2(SO_4)_3$ | 1.005 |
| $MgSO_4$ | 1.10 |
| Mn | 0.124 |
| Cr | 0.0072 |
| V | 0.017 |
| $H_2O$ | Balance |

To this waste acid liquor was added ammonium sulfate such that for each mole of aluminum sulfate present in the solution there was present three moles of ammonium sulfate. The spent liquor, containing the ammonium sulfate, was then flash cooled under vacuum to about 0° C. At this point it was found that a large part of the iron originally present in the spent liquor precipitated as copperas ($FeSO_4 \cdot 7H_2O$). Also during this flash cooling period, it was found that some water had been removed from the solution. Thereafter the solution was cooled from about 0° C. to about minus 30° C. by a mechanical refrigeration step and the entire solution was held in residence for a sufficient period of time during the cooling to obtain equilibrium conditions. Subsequently the slurry containing crystallized alum, copperas, magnesium values, and other solids was vacuum filtered to obtain a residual filtrate having the following analysis (percent by wt.):

| | |
|---|---|
| $H_2SO_4$ | 28.6 |
| $FeSO_4$ | 1.27 |
| $TiO_2$ | 0.714 |
| $(NH_4)_2SO_4$ | 0.885 |
| $Al_2(SO_4)_3$ | 0.054 |
| $MgSO_4$ | 0.436 |
| Mn | 0.092 |
| Cr | 0.0066 |
| V | 0.025 |
| $H_2O$ | Balance |

The alum-copperas etc. filter cake had the following analysis (percent by wt.):

| | |
|---|---|
| $H_2SO_4$ | 10.2 |
| $FeSO_4$ | 31.0 |
| $TiO_2$ | 0.370 |
| $(NH_4)_2SO_4$ | 1.45 |
| $Al_2(SO_4)_3$ | 3.12 |
| $MgSO_4$ | 2.66 |
| Mn | 0.212 |
| Cr | 0.0097 |
| V | 0.029 |
| $H_2O$ | Balance |

The filtrate was concentrated to about 74% $H_2SO_4$ by heating to evaporate water. The clear product obtained was cooled and aged at 70° C. to bring out filterable solids, which were then removed on a vacuum filter. The filtrate from the final step then had an analysis as follows (percent by wt.):

| | |
|---|---|
| $H_2SO_4$ | 80.6 |
| $FeSO_4$ | 0.077 |
| $TiO_2$ | 0.166 |
| $(NH_4)_2SO_4$ | 1.35 |
| $Al_2(SO_4)_3$ | 0.059 |
| $MgSO_4$ | 0.025 |
| Mn | 0.0295 |
| Cr | 0.0159 |
| V | 0.0054 |
| $H_2O$ | Balance |

This 80% acid product, thus having been rid of any solid components, remained clear on storage. A portion of the 80% acid product was blended with 96% $H_2SO_4$ and 65% oleum to obtain a 93% acid concentrate. The 93% $H_2SO_4$ solution remained clear and free of solids and was readily adaptable for use in procedures ordinarily employing virgin sulfuric acid.

Example II

A waste acid liquor similar to that employed in Example I was treated in a manner similar to that of Example I except that ammonia was bubbled into the liquor in an amount such that for each mole of aluminum sulfate present in the liquor there was present in situ about 3 moles of ammonium sulfate. As in the previous example, there was obtained an 80% $H_2SO_4$ product free of any incipient solids, which remained clear on storage over an extended period of time, and which after blending to produce a 96% $H_2SO_4$ product remained clear and free of solids.

Example III

A waste acid liquor similar to that employed in Example I was treated in a manner similar to that of Example I except that potassium sulfate was added to the liquor as the monovalent alum-forming constituent, and in amount such that for each mole of aluminum sulfate present in the liquor there was present 3 moles of potassium sulfate. There was obtained an 80% $H_2SO_4$ concentrate substantially free of any solids. Blending of the 80% $H_2SO_4$ product to about a 96% $H_2SO_4$ product gave a concentrate which was slightly turbid in appearance but was readily adaptable for use in a procedure involving digestion of titaniferous ore.

Example IV

A waste acid liquor similar to that employed in the previous examples was treated in the same manner as Example I except that ammonium sulfate was added to the liquor in amount such that for each mole of aluminum sulfate in the liquor there was present 1.4 moles of ammonium sulfate. As in the previous examples, there was obtained an 80% $H_2SO_4$ product free of any incipient solids, which remained clear on storage, and which after fortification to a 96% $H_2SO_4$ product still remained clear and free of solids.

Example V

A residual acid filtrate, obtained by the method of Example I, and having the following analysis (percent by wt.):

| | |
|---|---|
| $H_2SO_4$ | 27.2 |
| $FeSO_4$ | 1.1 |
| $TiO_2$ | 0.6 | was concentrated by heating to evaporate water from solution. The concentrate produced was cooled and aged at 70° C. to crystallize out residual impurities, which were removed from the concentrated solution by vacuum filtration. The filtrate had an analysis as follows (percent by wt.):

| | |
|---|---|
| $H_2SO_4$ | 94.2 |
| $FeSO_4$ | 0.02 |
| $TiO_2$ | 0.02 |

This 94.2% $H_2SO_4$ concentrate remained clear on storage and was readily adaptable as an article of commerce.

In effecting treatment of waste sulfuric acid liquors in accordance with the present invention, the conditions of the above examples were duplicated except that such ammonium compounds and potassium compounds as $NH_4OH$, $K_2CO_3$, $(NH_4)_2CO_3$, $NH_4Cl$, $NH_4C_2H_3O_2$, KOH, KCl, were employed as monovalent alum-forming constituents. These compounds were characteristically as effective as the alum-forming compounds employed in the examples above in removing the aluminum values.

The invention possesses many advantages not obtainable from previously known methods. Its application to the recovery of acid values from spent acid solution is particularly effective for recovering such acid values in a concentrated state whereby they may be employed as an article of commerce. From this point of view, the instant process is one which makes possible the reuse of the sulfuric acid in known methods for producing a white titanium pigment.

The invention is particularly effective in purifying and recovering the acid values from titanium pigment producing operations. It has been clearly shown by the description of the instant invention and by the examples presented that a substantially pure, concentrated sulfuric product is obtained from spent sulfuric acid liquors containing solubilized aluminum values. Further, it has been shown possible to reclaim mother liquors derived from hydrolysis of titanium sulfate solutions or spent sulfuric acid liquors of a like nature, by an economical and efficient process, whereby such reclaimed acids are adaptable for digestion of titaniferous ores. From the foregoing description and examples, it will be apparent that the invention has many advantages over processes which have been used heretofore inasmuch as the instant invention is relatively simple and readily adaptable to a commercial scale operation.

While this invention has been described and illustrated by the examples shown, it is not intended to be strictly limited thereto, and other variations and modifications may be employed within the scope of the following claims.

I claim:

1. A process for treating waste sulfuric acid liquor containing solubilized trivalent alum-forming cations and dissolved iron and magnesium impurities to obtain a residual acid solution amenable to concentration which comprises: introducing into said liquor a monovalent alum-forming constituent in at least an amount to react stoichiometrically with said alum-forming cations; cooling the treated liquor to a temperature below about −10° C., holding said liquor at said temperature for a period of time sufficient to crystallize out an alum compound and said iron and magnesium impurities as a filterable crystalline mass; and separating the filterable crystalline mass from the liquor to obtain a residual acid solution effectively free of said metallic impurities.

2. A process for treating waste sulfuric acid liquor containing sulfates of aluminum, iron and magnesium and derived from hydrolysis of titanium sulfate solutions to obtain a residual acid solution containing less than about 0.3% aluminum sulfate and substantially free of the sulfates of iron and magnesium which comprises: introducing into said liquor at least 1 mole of an alum-forming compound selected from the group consisting of ammonia, ammonium sulfate, and potassium sulfate for each mole of aluminum sulfate present in said liquor; cooling the treated liquor to a temperature below about minus 10° C. maintaining the liquor below about −10° C. for a period of time sufficient to crystallize out the iron, aluminum, and magnesium as a filterable crystalline mass comprising ferrous sulfate, an alum compound selected from the group consisting of potassium alum and ammonium alum, and magnesium sulfate, and separating the filterable crystalline mass from the liquor to obtain a residual acid solution containing less than about 55% $H_2SO_4$.

3. Process according to claim 2 wherein said alum-forming compound is ammonia and said alum compound is ammonium alum.

4. Process according to claim 2 wherein said alum-forming compound is ammonium sulfate and said alum compound is ammonium alum.

5. Process according to claim 2 wherein said alum-forming compound is potassium sulfate and said alum compound is potassium alum.

6. Process according to claim 2 wherein the treated liquor is cooled to a temperature of about minus 30° C.

7. Process according to claim 2 wherein said residual acid solution contains less than about 0.15% aluminum sulfate.

8. Process according to claim 2 wherein from about 1.5 moles to about 3 moles of said alum-forming compound are introduced for each mole of aluminum sulfate present in the liquor.

9. A process for producing concentrated sulfuric acid from waste acid liquor derived from hydrolysis of titanium sulfate solutions and containing sulfates of iron, aluminum and magnesium which comprises: introducing into said liquor at least one mole of an alum-forming compound selected from the group consisting of ammonia, ammonium sulfate and potassium sulfate for each mole of aluminum sulfate present in said liquor, cooling the treated liquor to a temperature below about minus 10° C. maintaining the liquor below about $-10°$ C. for a period of time sufficient to crystallize out the iron, aluminum and magnesium as a filterable crystalline mass comprising ferrous sulfate, an alum compound selected from the group consisting of ammonium alum and potassium alum, and magnesium sulfate, separating the crystalline mass from the liquor by filtration to obtain a residual acid solution having less than about 32% $H_2SO_4$ and less than about 0.15% aluminum sulfate; concentrating said residual solution by heating to remove water, aging the concentrated solution at a temperature below about 70° C. to precipitate out incipient solids, and separating the solids from the concentrated solution to obtain a product containing at least about 75% $H_2SO_4$.

References Cited in the file of this patent

UNITED STATES PATENTS

| | | |
|---|---|---|
| 1,707,248 | Blumenfeld | Apr. 2, 1929 |
| 1,843,779 | McWhorter | Feb. 2, 1932 |
| 2,344,429 | Gelder | Mar. 14, 1944 |
| 2,467,271 | Peer | Apr. 12, 1949 |